United States Patent [19]

Kelly et al.

[11] Patent Number: 4,642,854
[45] Date of Patent: Feb. 17, 1987

[54] SOCKET FOR MOUNTING ON THE END OF A STEEL CABLE

[75] Inventors: Robert D. Kelly, Houston; Lawrence T. Yatsko, Spring, both of Tex.

[73] Assignee: Southwest Wire Rope, Inc., Houston, Tex.

[21] Appl. No.: 714,843

[22] Filed: Mar. 18, 1985

[51] Int. Cl.⁴ ............................................. F16G 11/00
[52] U.S. Cl. ................... 24/265 R; 24/129 R; 24/136 L; 24/265 EE; 403/211
[58] Field of Search .......... 24/265 R, 265 C, 265 EE, 24/30.5 L, 543, 447, 693, 148, 129 D, 136 R, 136 B, 136 L, 231; 29/525; 403/282, 284, 361, 211

[56]  References Cited

U.S. PATENT DOCUMENTS

| | | | |
|---|---|---|---|
| 322,501 | 7/1885 | Taylor | 24/129 R |
| 356,691 | 1/1887 | Loch | 24/136 R |
| 1,218,138 | 3/1917 | Wachter | 24/136 R |
| 1,242,063 | 10/1917 | Southland | 24/136 R |
| 1,354,905 | 10/1920 | Hamilton | 24/129 D |
| 2,308,286 | 1/1943 | Joyce | 24/129 D |
| 2,414,945 | 1/1947 | Grund | 24/231 |
| 2,827,680 | 3/1958 | Gibson | 403/211 |
| 3,002,240 | 10/1961 | Laguerre | 24/30.5 L |
| 3,114,969 | 12/1963 | Roth | 29/525 |
| 3,264,017 | 8/1966 | Lagarde | 24/265 EE |
| 3,507,949 | 4/1970 | Campbell | 24/265 EE |
| 3,524,226 | 8/1970 | Brown | 24/543 |
| 4,488,335 | 12/1984 | Fox et al. | 24/693 |

FOREIGN PATENT DOCUMENTS

| | | | |
|---|---|---|---|
| 163340 | 6/1921 | United Kingdom | 24/136 R |
| 2088713 | 6/1982 | United Kingdom | 24/265 R |

Primary Examiner—Victor N. Sakran
Attorney, Agent, or Firm—Ranseler O. Wyatt

[57] ABSTRACT

A socket for mounting an end of a wire rope having a body member, said body member having a bowl therein for receiving said wire rope end and molten zinc to anchor the rope in the socket, the external surface of the socket providing a contoured, reinforced connection, adapted to conform to the angle of a vehicle tailboard, or of a drum.

4 Claims, 3 Drawing Figures

SOCKET FOR MOUNTING ON THE END OF A STEEL CABLE

BACKGROUND OF THE INVENTION

Sockets, secured to the ends of wire rope, are subject to extreme pressures and hard usage. The eye for the attachment of a shackle, or the like, is usually rectangular and vulnerable to breakage on the tailboard of a vessel, or the like, being loaded, over which said wire rope is drawn, and the bending of the wire rope at the point of connection with the socket as the wire rope is drawn over a tailboard, or on to a drum, imparts great strain to that particular area of the wire rope, often kinking or breaking the wire strands of the rope. It is an object of this invention to provide a socket that will have the required strength in proper areas to resist severe strain and to promote smooth wire rope movement over the tailboards and drums without kinking or binding.

SUMMARY OF THE INVENTION

A socket to be mounted on one end of wire rope, said socket having contours to provide strength through wall thickness where needed, and being contoured to move over tailboards of vehicles or vessels, and to be received on take-up drums, and the like, without bending or kinking the wire rope at its point of entry into the socket.

DESCRIPTION OF THE PREFERRED EMBODIMENT

Figure 1:
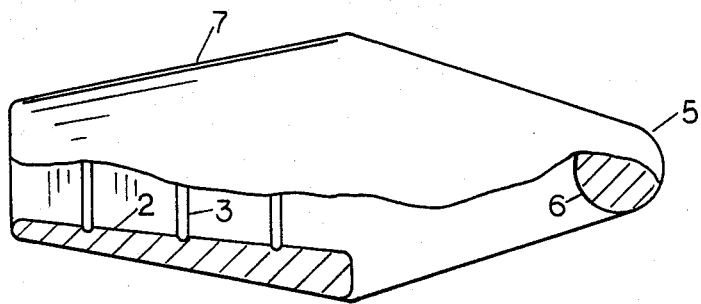
FIG. 1 is a side view of the socket, partially in cross section.
Figure 2:
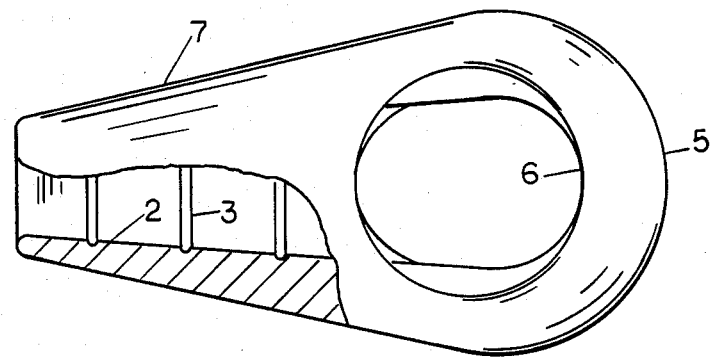
FIG. 2 is a top view, partially in cross section.
Figure 3:
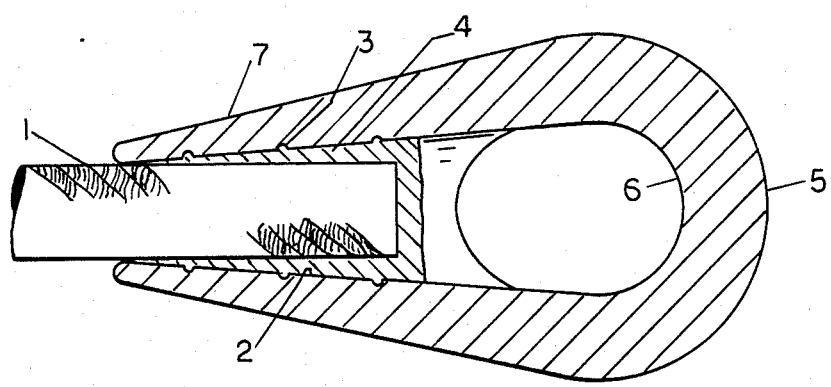
FIG. 3 is a top elevational view in cross section, showing a wire rope end mounted in the socket.

In the drawings, the numeral 1 designates a wire rope, one end of which is inserted into the socket bowl 2 is formed with a series of annular grooves 3, 3 which assist in attaching the wire rope to the socket when molten zinc, as 4, is poured into the bowl.

The external surface of the socket tapers outwardly from one end and the internal surface of the bowl 2 tapers outwardly from said end of the bowl 2 forming an elongated tubular body member, and the taper of the external surface 7 is greater than that of the internal surface, which results in an increase in wall thickness and increase in strength therein. Said external surface taper will terminate at the base of the loop 5, and said surface taper is integral with the loop 5, and the loop 5 forms the bail of the socket, the sides of the bail being rounded and smooth, and forms the transverse port 6 forming an eye piece for connection with a shackle, or the like.

In use, one end of a wire rope is inserted in the bowl 2 and a liquid attaching means, such as zinc is poured into the bowl through the eye piece, and, when the attaching means is set, a shackle, or the like, is secured to the socket by passing a shackle pin (not shown) through the eye piece 6. The bail formed by the loop 5 is easily drawn over a tailboard of a vehicle, or onto a drum, the contour of the socket forming an angle with the tailboard or drum.

What we claim is:

1. In a socket to be mounted on one end of a wire rope, an elongated tubular, outwardly tapered body forming a socket bowl to receive said rope, an integral inwardly tapered bail formed at one end, annular grooves in the internal wall of said bowl adapted to cooperate with a liquid attaching means, said ball extends from two points in one end surface of said body member and the remainder of said end surface being tapered inwardly and provides access to said bowl for insertion of liquid attaching means, wherein, said body member is contoured to conform to the angle of the tail-board of a vehicle without kinking said wire rope as the wire rope is drawn thereover.

2. The device defined in claim 1 wherein said bail is integral with and tapers inwardly from the widest point of said body member to the major center line axis.

3. The device defined in claim 1 wherein said body member is contoured to conform to the angle of the periphery of a drum to cause the wire rope to follow without kinking.

4. The device defined in claim 1 wherein the internal surface of the bowl tapers outwardly from one end thereof to the bail, and the external surface of the body member tapers outwardly from one end to the bail, the taper of the external surface being greater than the taper of the internal surface of the bowl providing a reinforced area at and adjacent the widest end of the body member.

* * * * *